(12) United States Patent
Ii

(10) Patent No.: US 7,480,589 B2
(45) Date of Patent: Jan. 20, 2009

(54) METHOD AND SYSTEM FOR DISPLAYING SIGNAL ENVELOPE INFORMATION FOR AN RF SIGNAL

(75) Inventor: Mutsuya Ii, Shoreline, WA (US)

(73) Assignee: Agilent Technologies, Inc., Santa Clara, CA (US)

( * ) Notice: Subject to any disclaimer, the term of this patent is extended or adjusted under 35 U.S.C. 154(b) by 74 days.

(21) Appl. No.: 11/345,087

(22) Filed: Jan. 31, 2006

(65) Prior Publication Data

US 2007/0179741 A1  Aug. 2, 2007

(51) Int. Cl.
G06F 15/00 (2006.01)
G06F 19/00 (2006.01)
G06F 17/18 (2006.01)

(52) U.S. Cl. .............. 702/179; 702/189; 329/347; 329/363; 369/107; 375/353

(58) Field of Classification Search ............ 702/76, 702/77, 117, 179, 189, 193, 194; 329/347, 329/363, 372; 369/107, 99; 375/353; 455/41.2; 324/76.12, 76.21, 76.24, 76.28; 708/405
See application file for complete search history.

(56) References Cited

U.S. PATENT DOCUMENTS 3,742,391 A * 6/1973 Smith ................ 333/100
6,700,536 B1 * 3/2004 Wiegand ............ 342/417
7,023,773 B2 * 4/2006 Park ................. 369/47.53

OTHER PUBLICATIONS

Greenstein et al., 'Envelope Fluctuation Statistics of Filtered PSK and Other Digital Modulations', Apr. 1979, IEEE Publication, vol. COM-27, No. 4, pp. 750-760.*

Yousefzadeh et al.,'Efficiency Optimization in Linear-Assisted Switching Power Converters for Envelope Tracking in RF Power Amplifiers', 2005, IEEE Publication, pp. 1302-1305.*

Gard et al., 'The Impact of RF Front-End Characteristics on the Spectral Regrowth of Communicaitons Signals', Jun. 2005, IEEE Publication, vol. 53, No. 6, pp. 2179-2186.*

* cited by examiner

Primary Examiner—Edward Raymond
Assistant Examiner—Elias Desta

(57) ABSTRACT

Digitally sampled real or sampled and down-converted complex data representing an RF signal are received. One or more statistical computations are calculated for each group of N data values. The one or more statistical computations are calculated for groups of N data values until a particular number of data values (K) are acquired. The one or more statistical computations calculated for each group are computed and stored at the time of acquisition and are available for immediate viewing on a display.

19 Claims, 3 Drawing Sheets

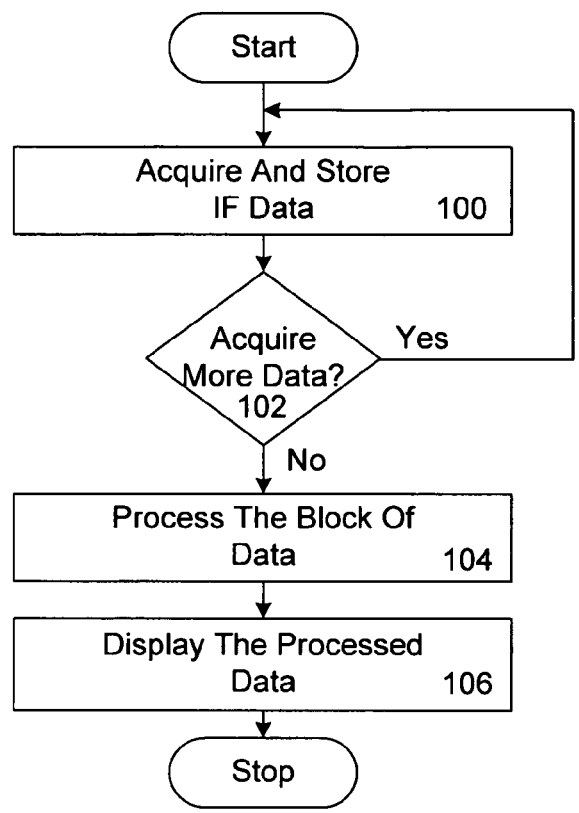
FIG. 1 – Prior Art
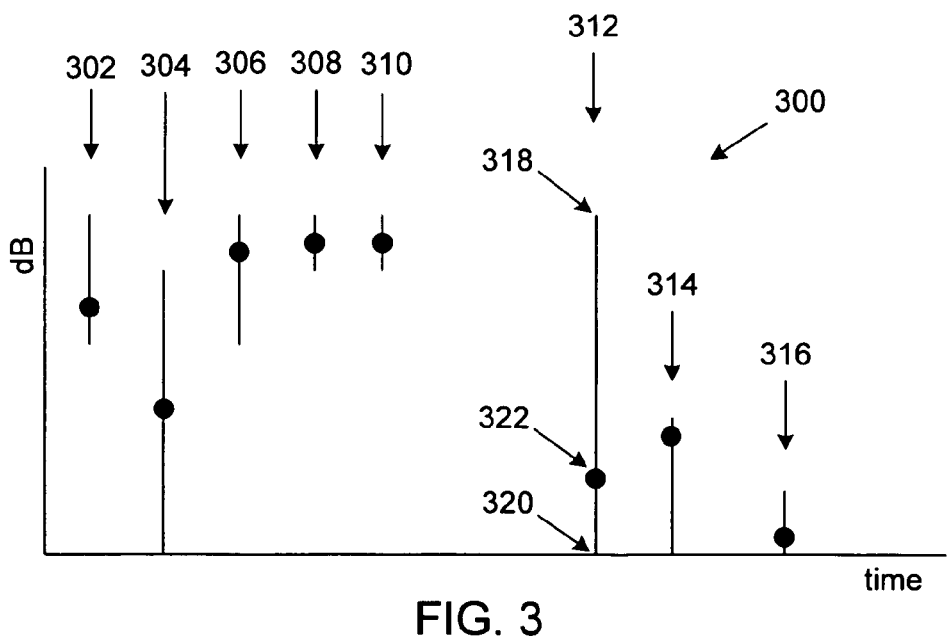
FIG. 3

METHOD AND SYSTEM FOR DISPLAYING SIGNAL ENVELOPE INFORMATION FOR AN RF SIGNAL

BACKGROUND

RF signals are measured and processed for a variety of purposes. For example, RF signals are measured and processed when designing and testing RF devices, such as cellular telephones, RF test equipment, and VHF transceivers. Signal power, modulation, harmonic distortion, and noise are examples of different measurements that are measured for an RF device. The measurements may then be displayed to a user in a graph that plots the measurement over time or frequency.

FIG. 1 is a flowchart of a method for displaying signal envelope information in accordance with the prior art. Signal envelope information typically displays RF signal characteristics in terms of a measured value, such as power, with respect to time. Initially RF data values are sampled and converted to baseband or intermediate frequency (IF) data. The IF data values are converted, for example, to in-phase (I) and quadrature (Q) complex data pairs. The complex data are then stored, as shown in block 100.

A determination is then made at block 102 as to whether more complex data pairs are to be acquired and stored. If so, the process returns to block 100. When all of the data have been acquired and stored, the method passes to block 104 where the block of complex data is processed. The complex data values are processed for a particular application. To display signal power envelope information, for example, the log of the magnitude ($\sqrt{I^2+Q^2}$) for each complex data pair is calculated. The results are then displayed, as shown in block 106.

The speed at which the data values are processed and the graphs or displays of the signal information (e.g., envelope, overview) are output to a monitor can be impacted in the method of FIG. 1. Post-processing of the complex data pairs can be time-consuming, especially when large amounts of sampled data have been acquired. Moreover, the types of calculations performed with the stored data values can also impact the speed. Calculations on complex data, such as log ($\sqrt{I^2+Q^2}$), can significantly reduce the speed of the data processing when performed post acquisition. Typically many of the display formats require some trigonometric or other computationally expensive function. For large data captures of complex time data, a viewer can wait a long period of time before the signal envelope calculation or some other calculation is displayed. To reduce this waiting period, some systems decimate or re-sample the data prior to performing the computations in order to reduce the amount of data that is processed. For example, some systems discard N–1 of N values. But this can result in the loss of significant information.

SUMMARY

In accordance with the invention, a method and system for displaying signal envelope information are provided. Digitally sampled real or sampled and down-converted complex data representing an RF signal are received. One or more statistical computations are calculated for each group of N data values. The one or more statistical computations are calculated for groups of N data values until a particular number of data values (K) are acquired. The one or more statistical computations calculated for each group are computed and stored at the time of acquisition and are available for immediate viewing on a display.

BRIEF DESCRIPTION OF THE DRAWINGS

FIG. 1 is a flowchart of a method for displaying signal envelope information in accordance with the prior art;

FIG. 3 is a display of signal envelope information in an embodiment in accordance with the invention.

DETAILED DESCRIPTION

The following description is presented to enable embodiments in accordance with the invention to be made and used, and is provided in the context of a patent application and its requirements. Various modifications to the disclosed embodiments will be readily apparent, and the generic principles herein may be applied to other embodiments. Thus, the invention is not intended to be limited to the embodiments shown, but is to be accorded the widest scope consistent with the appended claims and with the principles and features described herein.

Figure 2:
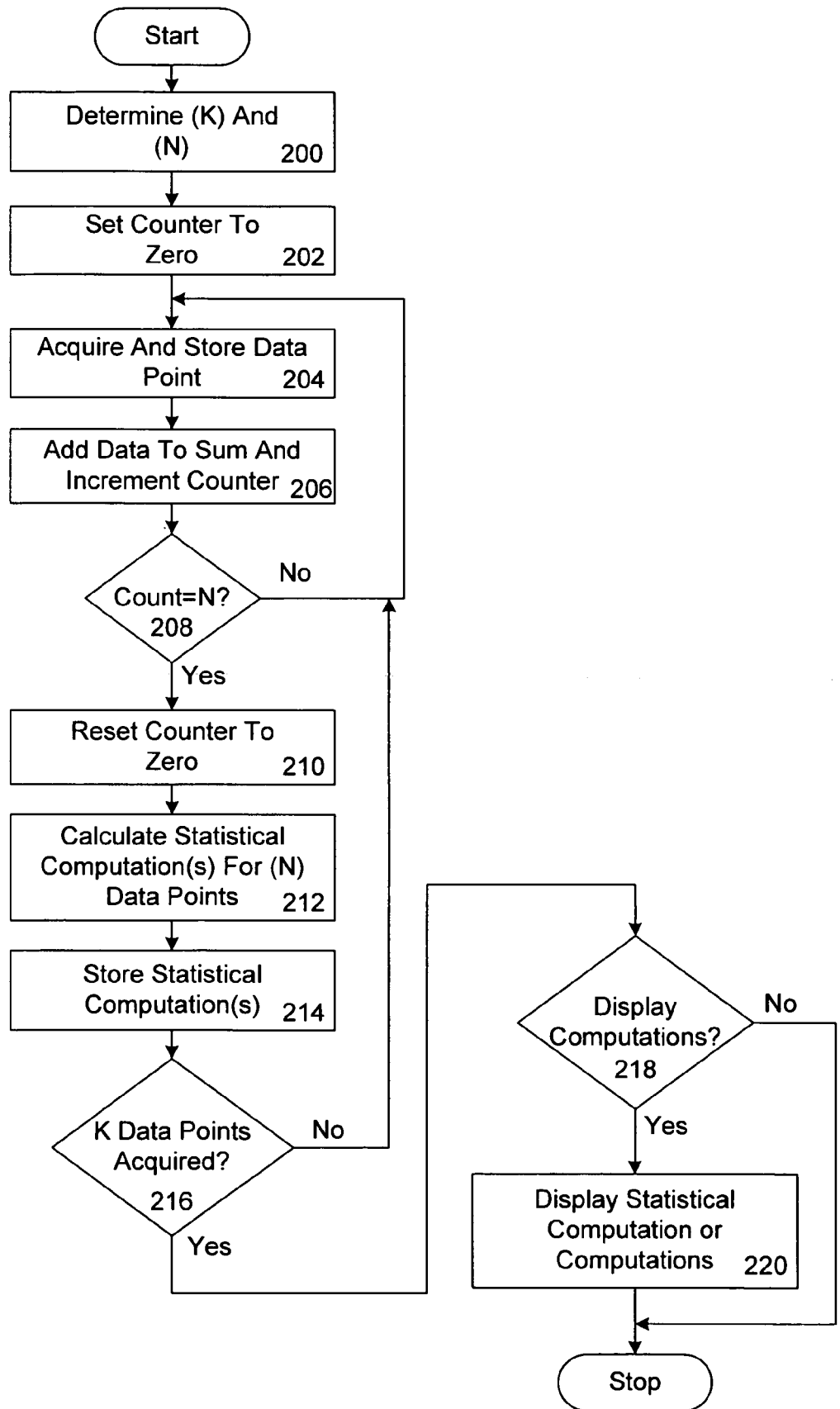
FIG. 2 is a flowchart for displaying signal envelope information in an embodiment in accordance with the invention.

With reference to the figures and in particular with reference to FIG. 2, there is shown a flowchart for displaying signal envelope information in an embodiment in accordance with the invention. Initially the total number of data values to be acquired (K) and the number of data values in each group (N) are determined, as shown in block 200. K and N may represent any given numbers of data values. A counter is set to zero (block 202) and a data value acquired and stored (block 204). A data value includes the in-phase (I) and quadrature (Q) complex data values in an embodiment in accordance with the invention. Acquired RF data is converted to provide the I and Q complex data values. Other embodiments in accordance with the invention may use different types of data, such as, for example, power versus time information, single I or Q baseband data, computed magnitudes, or simply real data emanating from the output of an analog-to-digital converter.

After the data value is acquired, the data is added to a sum or running total and a counter incremented by one (block 206). Other embodiments in accordance with the invention may obtain and track additional statistical information from the data. For example, a numeric comparator can be used for each incoming data pair to determine whether it is greater than a stored maximum or less than a minimum, thereby tracking the statistical extents of this data.

A determination is then made at block 208 as to whether the count equals N. If not, the method returns to block 204 and repeats until the count equals N. When the count equals N, the counter is reset to zero (block 210) and one or more statistical computations are calculated for the N data values (block 212). The computed statistical computation or computations are then stored, as shown in block 214.

Next, at block 216, a determination is made as to whether K data values have been acquired. If not, the process returns to block 204 and repeats until K data values are acquired. A determination is then made at block 218 as to whether the computed statistical computation or computations are to be displayed. If so, the one or more statistical computations are displayed, as shown in block 220.

FIG. 3 is a display of signal envelope information in an embodiment in accordance with the invention. Display 300 includes a number of plots 302, 304, 306, 308, 310, 312, 314, 316. A plot 302, 304, 306, 308, 310, 312, 314, 316 is calculated for each group of N data values. In the embodiment shown in FIG. 3, each plot displays three statistical computations. The statistical computations include maximum value 318, minimum value 320, and average value 322.

Other embodiments in accordance are not limited to the statistical computations shown in FIG. 3. Any number and type of statistical computations, including, but not limited, to minimum, maximum, median, average, and mode information. By way of example only, the mode information may be displayed using different sized or colored dots when plotting each group of N data values.

Embodiments in accordance with the invention are also not limited to the display format shown in FIG. 3. Other embodiments in accordance with the invention may display the computations for each group of N data values differently. By way of example only, the computations for each group may be displayed as a list or in a table format.

Figure 4:
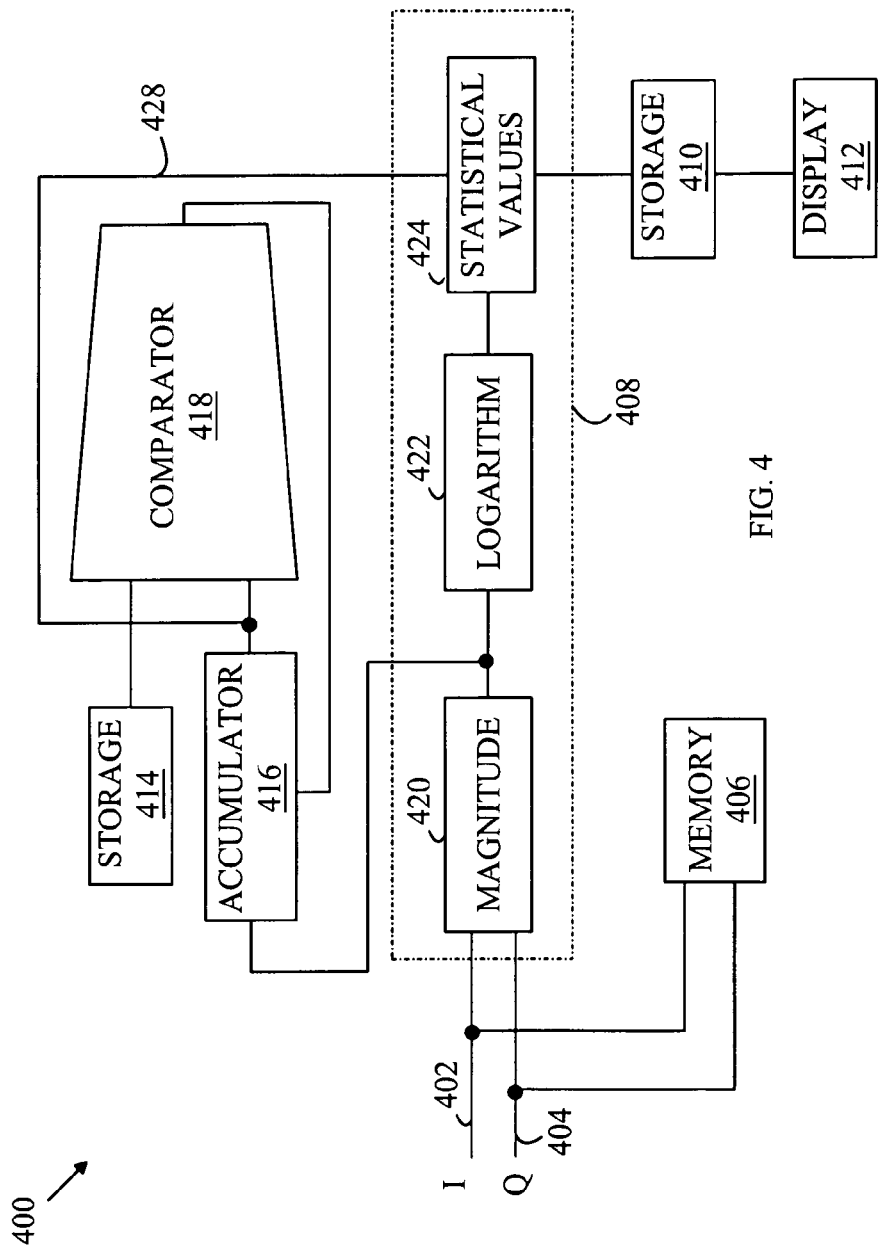
FIG. 4 is a block diagram of a system for generating signal envelope information in an embodiment in accordance with the invention.

Referring to FIG. 4, there is shown a block diagram of a system for generating signal envelope information in an embodiment in accordance with the invention. Only those components of an RF device needed to describe the invention are shown in FIG. 4. System 400 may be implemented in any RF device that processes and displays RF data, such as, for example, spectrum analyzers, DSP analyzers, vector signal analyzers, and oscilloscopes.

System 400 includes complex data value inputs 402, 404, memory 406, complex data processing unit 408, storage 410, display 412, storage 414, accumulator 416, and comparator 418. complex data processing unit 408, storage 414, accumulator 416, and comparator 418 are implemented in a field programmable gate array (FPGA) while memory 406, storage 410, and display 412 are implemented as discrete components independent of the FPGA in an embodiment in accordance with the invention. Complex data processing unit 408 may therefore be re-configured to perform different statistical computations in an embodiment in accordance with the invention.

System 400 may be implemented differently in other embodiments in accordance with the invention. For example, complex data processing unit 408, storage 414, accumulator 416, and comparator 418 may be implemented in a programmable logic array (PLA/PAL), dedicated silicon as in an Application Specific Integrated Circuit (ASIC) or a microprocessor in other embodiments in accordance with the invention.

Baseband data values are configured as the I (input 402) and Q (input 404) complex data values in the embodiment of FIG. 4. Data values are simultaneously input into memory 406 and complex data processing unit 408 in an embodiment in accordance with the invention. Complex data processing unit 408 is configured to perform any particular computations with the complex data. For example, when the signal power envelope information is to be displayed, complex data processing unit 408 includes magnitude computation 420 to compute the sum of the squares ($I^2+Q^2$). Logarithm computation 422 then calculates the logarithm of the square root of the sum of the squares ($\sqrt{I^2+Q^2}$). Computational unit 424 computes one or more statistical values. Other embodiments in accordance with the invention may process inputs 402, 404 differently. For example, processing unit 408 may be configured to process inputs 402, 404 to generate linear magnitude, logarithm magnitude, or phase data values.

Accumulator 416 receives the output of magnitude computation 420 in order to accumulate a total or sum for the data. Accumulator 416 also counts the number of magnitude data values processed by magnitude computation 420. The number N, which represents the number of data values in each group, is stored in storage 414. Both N and the output of accumulator 416 are input into comparator 418. When the output of accumulator 416 equals N, the count in accumulator 416 is reset to zero via input 426.

The output of accumulator 416 is also input into computational unit 424 via input 428. Computational unit 424 performs some or all of the calculations to be displayed on display 412. Computational unit 424 is implemented with one or more registers in an embodiment in accordance with the invention. For example, when displaying the minimum, maximum, and average data values shown in FIG. 3, computational unit 424 is implemented with three registers, one for each computation.

Computational unit 424 is able to maintain one or more running calculations when output of accumulator 416 is input into computational unit 424. The one or more calculations are stored in storage 410 when the indexed count of accumulator 416 equals N. This allows computational unit 424 to begin calculating the one or more statistical computations for this group of N data values. Storage 410 will therefore have (K/N) entries, where K equals the total number of I and Q data values to be received on inputs 402, 404. Display 412 displays the (K/N) entries.

Thus, system 400 stores complex data values received on inputs 402, 404 while calculating one or more particular statistical computations using groups of N data values at the time of data acquisition. This reduces the amount of processing time, as the complex data pairs are processed in real-time or near real-time. This allows the one or more statistical computations calculated for each group to be displayed more quickly in response to a viewer's display request in an embodiment in accordance with the invention. The one or more displayed statistical computations provide users with an overview of one or more characteristics of an RF signal.

Other embodiments in accordance with the invention are not limited to the configuration of blocks and the type of blocks shown in FIG. 4. Additional or different blocks may be used in other embodiments in accordance with the invention. Moreover, one or more of the blocks shown in FIG. 4 may be eliminated in other embodiments in accordance with the invention. For example, complex data processing unit 408 may be bypassed or not used in some embodiments in accordance with the invention. This allows computational unit 424 to calculate the one or more computations using the complex data values received on inputs 402, 404. As another example, inputs 402, 404 may be real time data values (time domain data) instead of I and Q complex data values. And as yet another example, storage 414, accumulator 416, and comparator 418 may be configured within computational unit 424.

The invention claimed is:

1. A method for displaying signal envelope information for an RF signal, the method comprising:

acquiring a group of N data values, wherein each data value represents one or more values of the RF signal;

calculating one or more statistical values for the group, each statistical value being related to the signal envelope information; and repeatedly acquiring a group of N data values and calculating one or more statistical values for the group until K data values have been acquired, wherein K represents the total number of acquired data values and N is less than K; and outputting at least one of the statistical values.

2. The method of claim 1, further comprising displaying the one or more of the calculated statistical values for each group of N data values.

3. The method of claim 2, further comprising storing the acquired data values.

4. The method of claim 1, further comprising storing the one or more of the statistical values calculated for each group.

5. The method of claim 1, further comprising determining whether K data values have been acquired after calculating one or more statistical values for the group.

6. The method of claim 1, further comprising determining a value for K, the total number of data values to be acquired.

7. The method of claim 1, further comprising determining a value for N, the number of data values to be acquired in each group.

8. The method of claim 2, wherein displaying the statistical values calculated for each group of data values comprises displaying the statistical values calculated for each group of data values in response to a command.

9. A method for displaying a signal envelope information for an RF signal, the method comprising:
   a) acquiring a plurality of data values, wherein each data value represents one or more values of the RF signal;
   b) incrementing a count when each data value is acquired;
   c) determining whether the count equals a value N, wherein N represents a number of data values to be included in a group;
   d) calculating one or more statistical values for the group when the count equals the value N, each statistical value being related to the signal envelope information;
   e) resetting the count to zero when the count equals N; and
   f) repeating a) through e) until K data values have been acquired, wherein K represents the total number of acquired data values and N is less than K and outputting at least one of the computed values.

10. The method of claim 9, further comprising
   g) displaying the one or more statistical values calculated for each group of N data values.

11. The method of claim 9, further comprising storing each data value.

12. The method of claim 9, further comprising storing the one or more statistical values calculated for each group.

13. The method of claim 9, further comprising determining a value for N, the number of data values to be included in a group.

14. A system for computing signal envelope information for an RF signal, the system comprising:
   a first storage for storing a value N representing a number of data values to be in a group, wherein each data value represents one or more values of the RF signal;
   a counter for counting each input data value; a computational unit for receiving the data values and when an output of the counter equals N calculating one or more statistical values for a group of N data values, each statistical value being related to the signal envelope information; and
   a display that displays the statistical values.

15. The system of claim 14, further comprising a second storage for storing the one or more statistical values for each group of N data values.

16. The system of claim 15, further comprising a display connected to the second storage for receiving and displaying the one or more statistical values for each group of N data values.

17. The system of claim 14, further comprising a third storage for storing the data values.

18. The system of claim 14, further comprising an RF processing unit for receiving and processing the data values, wherein an output of the RF processing unit is input into the computational unit.

19. The system of claim 14, further comprising a comparator connected to an output of the first storage and an output of the counter, wherein an output of the comparator is input into the computational unit.

* * * * *